United States Patent [19]

Hempelmann

[11] Patent Number: 4,844,551

[45] Date of Patent: Jul. 4, 1989

[54] WHEEL TRIM FOR AUTOMOTIVE VEHICLE

[75] Inventor: Heinrich J. Hempelmann, Livonia, Mich.

[73] Assignee: NI Industries, Inc., Novi, Mich.

[21] Appl. No.: 77,683

[22] Filed: Jul. 24, 1987

[51] Int. Cl.⁴ .......................... B60B 7/04; B60B 7/06
[52] U.S. Cl. ............................. 307/37 SS; 301/37 R; 301/37 S
[58] Field of Search ................. 301/37 SS, 37 S, 37 P, 301/37 R, 37 C, 37 CD, 37 AT, 108 R

[56] References Cited

U.S. PATENT DOCUMENTS

| | | |
|---|---|---|
| 2,016,395 | 10/1935 | Sinclair . |
| 2,447,021 | 8/1948 | Lyon . |
| 2,493,001 | 1/1950 | Lyon . |
| 2,531,449 | 11/1950 | Lyon . |
| 2,626,838 | 1/1953 | Lyon . |
| 2,629,635 | 2/1953 | Lyon . |
| 2,933,345 | 4/1960 | Lyon . |
| 2,935,360 | 5/1960 | Lyon . |
| 3,013,639 | 12/1961 | Lyon . |
| 3,333,900 | 8/1967 | Aske, Jr. . |
| 3,397,919 | 8/1968 | Aske, Jr. . |
| 3,480,329 | 11/1969 | Foster et al. . |
| 3,512,840 | 5/1970 | Foster et al. . |
| 3,594,046 | 7/1971 | Marshall . |
| 3,876,257 | 4/1975 | Buerger . |
| 3,989,306 | 11/1976 | Buerger . |
| 4,346,940 | 8/1982 | Tatar . |
| 4,452,493 | 6/1984 | Liggett . |
| 4,576,415 | 3/1986 | Hempelmann ........................ 301/375 |

Primary Examiner—James B. Marbert
Attorney, Agent, or Firm—Harness, Dickey & Pierce

[57] ABSTRACT

A decorative wheel cover for disposition at the outer side of a wheel includes an annular skirt for disposition adjacent to an annular flange of the vehicle wheel, and resilient means connected to the skirt and configured for 360° resilient nonslipping sealing engagement with the annular flange when disposed thereagainst whereby to eliminate any axial gap therebetween and resist or inhibit possible relative rotation thereof.

17 Claims, 2 Drawing Sheets

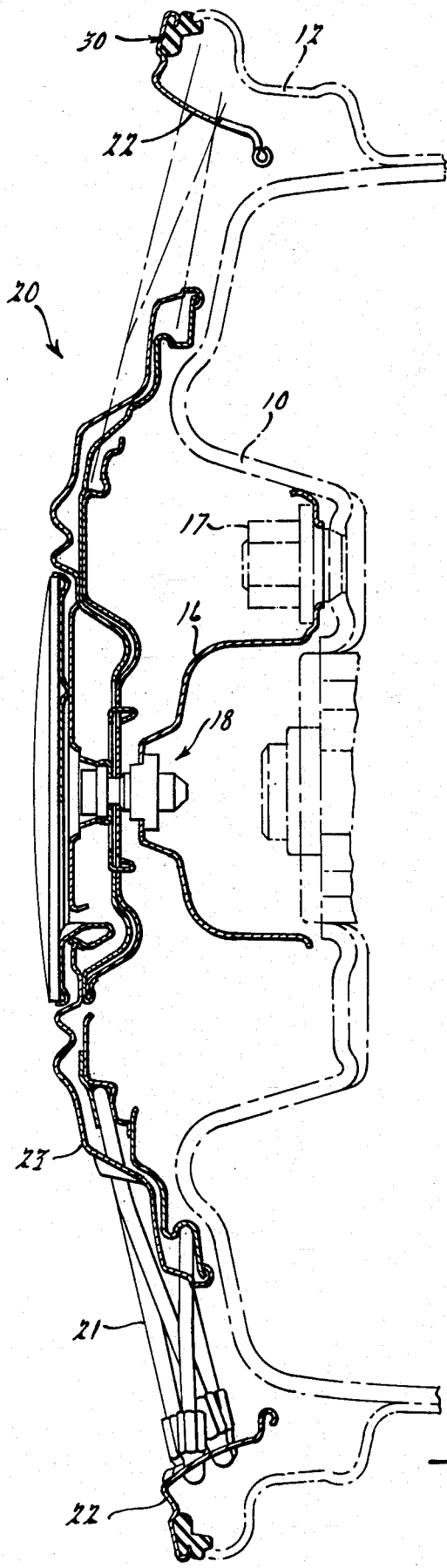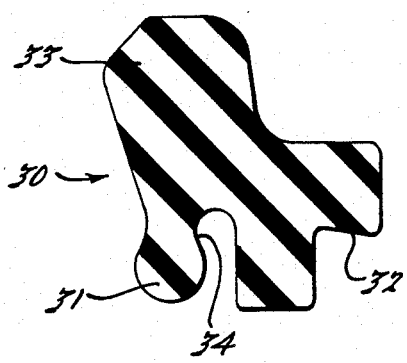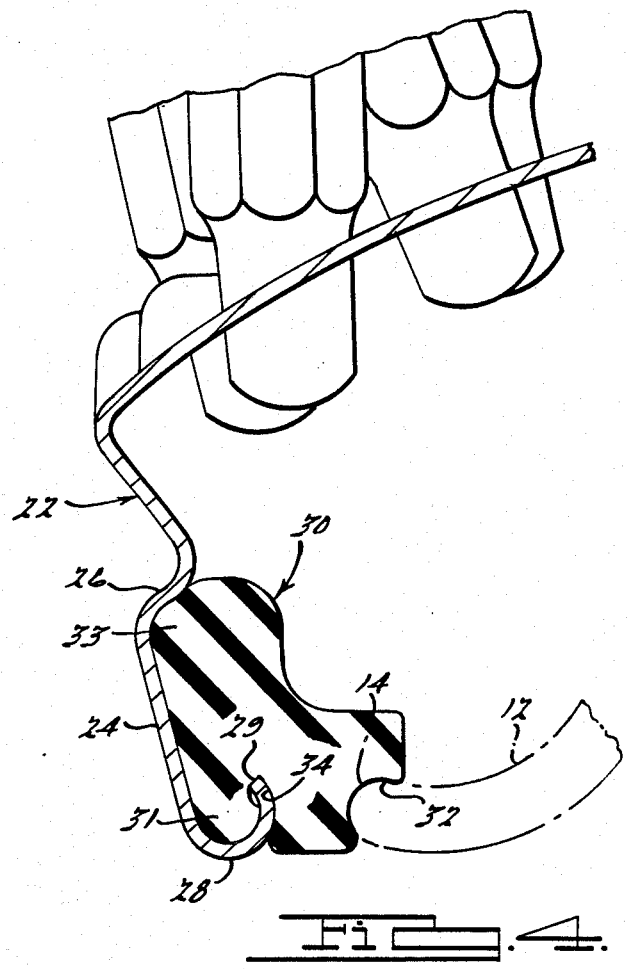

WHEEL TRIM FOR AUTOMOTIVE VEHICLE

The present invention relates to wheel trim for automotive vehicles and particularly to an improved construction eliminating any axial gap between the rim of the wheel trim the rim of the vehicle wheel to thereby improve appearance and provide other advantages.

Numerous types of wheel trim for vehicle wheels have been developed over the years. One common problem encountered is how to prevent relative rotation of the wheel trim with respect to the vehicle wheel because the wheel trim is subjected to inertial torque loading due to sudden and rapid acceleration or deceleration of the vehicle wheel. When the trim is mounted utilizing center retention this would place unnecessary loads on the retention. It would therefore be desirable to have an anti-rotation arrangement for resisting and withstanding such rotational loading.

While the wheel trim is typically intended to fit relatively closely to the wheel an axial gap will usually exist between the outer rim of the trim and the vehicle wheel, thereby providing an opportunity for wind noise, vibration and rattling. Wheels are susceptible to misalignment and unbalance, which can aggravate the situation.

The present invention overcomes the above noted problems, while at the same time providing an improved very attractive appearance somewhat akin to that of a fully styled wheel.

Additional advantages and features of the present invention will become apparent from the subsequent description and the appended claims taken in conjunction with the accompanying drawings, in which:

FIG. 2 is an enlarged view in cross-section of a seal in its relaxed shape.

FIG. 3 is a section view taken generally along line III—III of FIG. 1 showing the wheel trim secured to a vehicle wheel.

FIG. 4 is an enlarged view of a portion of FIG. 3 showing details of the manner in which the wheel trim engages the wheel.

Figure 1:
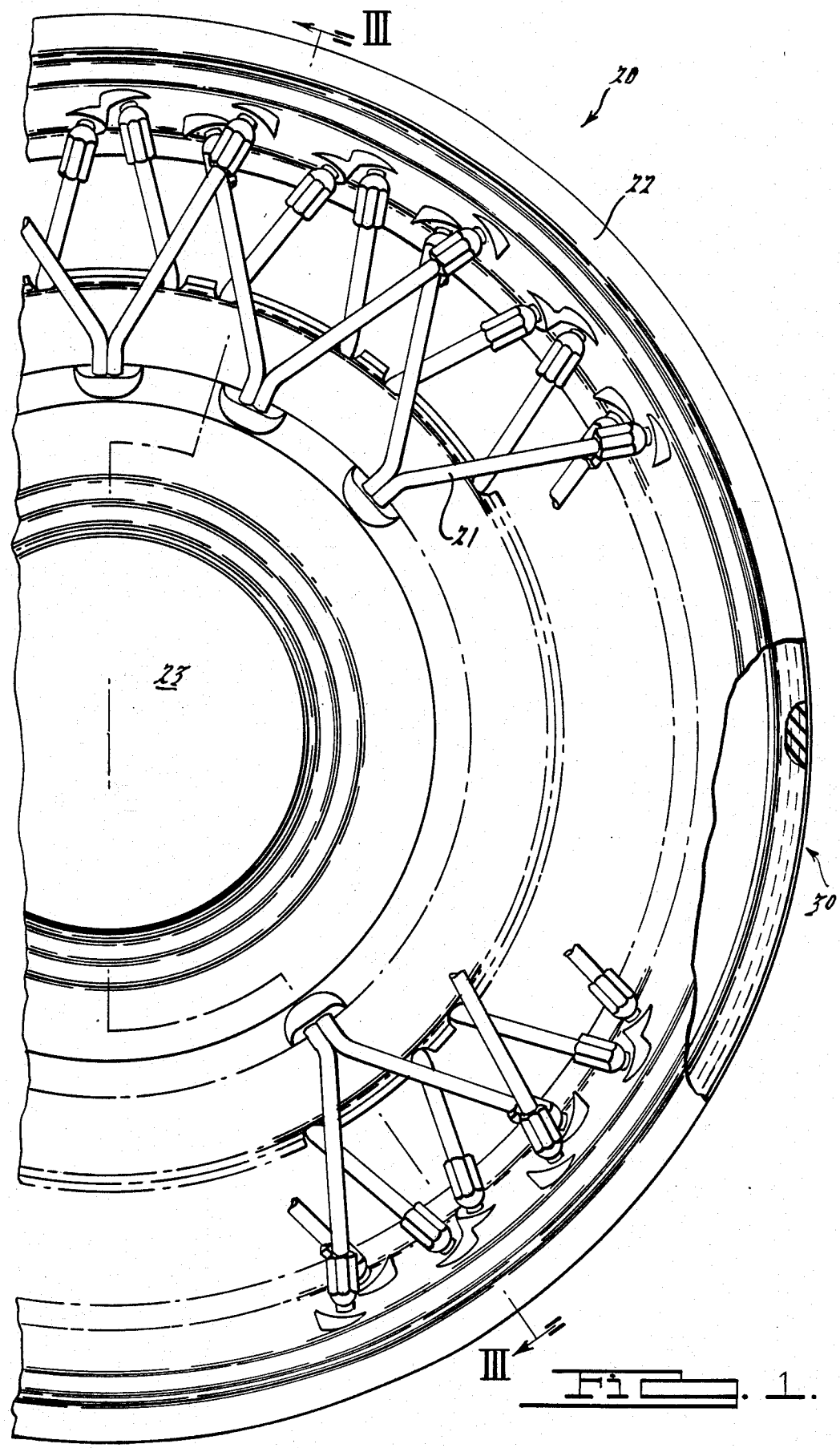
FIG. 1 is a partial plan view of a circular wire wheel trim in accordance with the invention and having a portion thereof partially broken away to show the cross-section of a portion thereof.

Referring now to the drawings, the improved trim of the present invention comprises a wire wheel cover 20 to which is attached a unique annular seal 30 embodying the principles of the instant invention. Wheel cover 20 is for disposition at the outer side of a vehicle wheel 10 having an annular mounting rim flange 12 extending axially outwardly therefrom an terminating in an annular axially outer rim edge portion 14.

The wheel cover is secured by a center cup-shaped lock bracket 16 affixed to vehicle wheel 10 by lug nuts 17 and having retention means 18 operative to enable the wheel cover to be secured to the lock bracket. Anti-rotation means of known design may be provided to prevent relative rotation of the wheel trim with respect to the vehicle wheel. This securement of the wheel trim to the vehicle wheel will not be discussed in greater detail since it forms no part of the instant invention. See U.S. Pat. No. 4,576,415 issuing Mar. 18, 1986 to Hempelmann, the disclosure of which is incorporated by reference herein.

Wheel cover 20 comprises a spoke retaining annular skirt 22, a plurality of generally radially extending spokes, generally designated 21, and a central spoke containment hub 23. Annular skirt 22 has been partially broken away in FIG. 1 to show (in section) the annular seal 30 connected thereto and has a generally radially extending planar portion 24, an axial shoulder 26 and a hook or curl 28 extending axially inwardly its outer rim and curving radially inwardly towards the center hub 23 to terminate in a free end 29. Curl 28 superposes the planar inner wall of the wheel cover to define a 360° annular cavity or recess therearound.

Seal 30 shown in its relaxed shape in FIG. 2 is generally L-shaped in cross-section and has an annular recess or notch 32 and an annular groove 34, each being on the foot of the "L" with recess 32 being adapted to provide a 360° seal about the axially projected portion 14 of wheel flange 12 and groove 34 being sized to receive free end 29 of the curl 28. Shown best in FIG. 4, the seal has a rounded annular portion 31 received in the annular recess of curl 28, and an annular portion 33 snugly seated against shoulder 26. The free end 29 of the hook engages groove 34 to hold the seal in place between curl 28 and shoulder 26.

In accord with this invention, the seal is preferably comprised of a straight length of relatively soft compressible elastomeric material that will fit into the annular recess around the skirt and also grippingly seal about the annular flange. In one example an elastomer of rubber having a durometer of about 50 (e.g. "EPDM Duro 50") was sufficient to achieve the desired needs of the seal. At each angular position of the seal relative to the end portion 14 the annular recess 32 engages upper and lower axial portions of the flange. The material is preferably soft enough that it will inhibit rotation of the skirt relative to the wheel rim due to friction and deform and seal around any wheel weight clips on the wheel rim. It should also resist axial rattling therebetween.

If desired, the outer rim of the wheel cover may be configured to be spaced from the annular flange such that a slight axial preload is placed on the seal when connected to the wheel cover.

Thus, there is disclosed in the above description and in the drawings embodiments of the invention which fully and effectively accomplish the objects thereof. However, it will be apparent that variations in the details of the apparatus may be indulged in without departing from the sphere of the invention herein described, or the scope of the appended claims.

What is claimed is:

1. In a wheel assembly including a wheel having a generally axially outwardly facing annular rim flange, a wheel cover for disposition at the outer side of the wheel and including mounting means acting centrally of said cover for mounting the center portion of the cover to said wheel, characterized by an annular skirt spaced radially from said center portion for disposition axially adjacent to said annular flange, and resilient means connected to said skirt and configured for 360° resilient sealing engagement with said flange when disposed thereagainst whereby to eliminate any axial gap therebetween, said skirt having an annular radially inwardly facing hook portion at the radially outer end thereof, said hook portion overengaging a portion of said resilient means to retain said resilient means in assembled relationship with said skirt.

2. The wheel assembly as recited in claim 1 wherein said resilient means comprises an annular seal separately provided and connected to said skirt and having an annular recess the cross-section of which being configured to conform to and engage a corresponding arcuate cross-section of said annular flange against which the seal is axially disposed.

3. The wheel assembly as recited in claim 2 wherein said skirt has a generally planar portion, the hook extends from said planar portion and defines an annular cavity therebetween, and said seal has a portion thereof compressed in said cavity when the hook is received in said annular groove.

4. The wheel assembly as recited in claim 2 wherein said annular seal is comprised of an elastomeric material such as rubber.

5. The wheel assembly as recited in claim 4 wherein said said elastomeric material has a durometer of about 50.

6. The wheel assembly as recited in claim 1 wherein said skirt is connected to its center portion by a plurality of spokes extending radially therebetween, and the outer rim of said skirt is configured to place an axial preload on said resilient means.

7. A wheel trim assembly for a vehicle wheel having an axially outwardly facing annular rim flange, comprising: an annular trim member, said trim member including retention means for securing said trim member to said wheel, and engagement means separate from said retention means acting 360° around and disposed axially between said trim member and the axially outwardly facing annular peripheral portion of said annular rim flange and compressively engaging said portion of said annular rim flange in a relatively nonslipping engagement so as to resist relative rotation therebetween, said engagement means including a resilient elastomeric seal extending axially inwardly from said trim member and having an annular portion extending substantially 360° therearound and configured to compressively engage the corresponding axial surface presented by said annular rim flange.

8. The wheel trim assembly as recited in claim 7 wherein said trim member comprises a central hub adapted to be nonrotatably secured connected to said wheel structure and a generally planar outer annular skirt connected thereto by a plurality of resilient spokes extending therebetween, said skirt axially circumposing and positioning said seal against said flange.

9. The wheel trim assembly as recited in claim 7 wherein said resilient seal is comprised of a non-metallic material.

10. A wheel trim assembly for a vehicle wheel comprising a trim member, retention means for locking the trim member to the vehicle in an axially outwardly facing relationship with respect to said wheel, and resilient rotation inhibiting means attached to said trim member and yieldably engageable with and operable against the axially outwardly facing peripheral edge and adjacent radially inwardly facing surface of the annular flange of said vehicle wheel for directly inhibiting axial and radial movement of the outer rim of the trim member relative to the flange to reduce forces from the vehicle leading to undesired separation of the trim element from the vehicle.

11. The wheel trim assembly as recited in claim 10 wherein said resilient means comprises a seal of elastomeric material being connected to said said outer rim, the seal having an annular recess configured to provide a substantially 360° engagement with the corresponding surface projected axially by the flange.

12. The wheel trim assembly as recited in claim 11 wherein said seal is L-shaped in cross-section comprising a foot portion including said annular recess and an annular groove and a back portion, and said trim member comprises an annular skirt having an annular cavity formed by a planar portion, a shoulder and a hook each extending axially inward from said planar portion, said shoulder facing radially outward and said hook facing radially inward, said seal being seated snugly in said cavity such that the hook is received in said annular groove and the back portion of said L-section is snugly against the planar portion and said shoulder.

13. The wheel trim assembly as recited in claim 12 wherein said hook has its free end engaging a surface of said annular groove whereby to axially bias the back portion of said seal against the skirt and to grippingly engage the seal to inhibit its slippage relative to the skirt.

14. A seal for closing any axial or radial gap which may exist between the outer periphery of a wheel cover and an annular rim flange extending axially outwardly from a vehicle wheel to which the wheel cover is mounted, characterized by said seal being L-shaped in cross-section and having a back portion adapted to seat against the wheel cover and a foot portion including an annular groove and an annular recess, said annular groove for receiving a radially inwardly facing connecting hook from the wheel cover to secure said seal to said trim member and said annular recess conforming in cross-section to the projected axial end portion of the rim for grippingly abutting and sealing 360° around the end portion.

15. The seal as recited in claim 14 wherein a rounded annular portion forms part of the back portion and part of the annular groove, the rounded portion being compressed against the wheel cover when the hook is received in the annular groove.

16. The seal as recited in claim 14 further characterized in that said seal is comprised of a compressible elastomeric material.

17. The seal as recited in claim 16 wherein said elastomeric material is comprised of a spongy rubber having a durometer of about 50.

* * * * *

UNITED STATES PATENT AND TRADEMARK OFFICE
CERTIFICATE OF CORRECTION

PATENT NO. : 4,844,551
DATED : July 4, 1989
INVENTOR(S) : Heinrich J. Hempelmann It is certified that error appears in the above-identified patent and that said Letters Patent is hereby corrected as shown below:

Column 1, line 4, after "relates" insert -- generally --.

Column 1, line 52, "an" (first occurrence) should be -- and --.

Column 2, line 5, after "inwardly" insert -- from --.

Column 3, line 15, claim 5, after "said" delete -- said --.

Column 4, line 8, claim 11, after "said" delete -- said --.

Signed and Sealed this

Fourteenth Day of August, 1990

*Attest:*

HARRY F. MANBECK, JR.

*Attesting Officer*     *Commissioner of Patents and Trademarks*